(12) United States Patent
Zhao et al.

(10) Patent No.: US 8,757,704 B2
(45) Date of Patent: Jun. 24, 2014

(54) LIGHTWEIGHT MULTI-LAYER COMPOSITE PANEL

(75) Inventors: Wenping Zhao, Granger, IN (US); Robert A. Barney, Channahon, IL (US)

(73) Assignee: Crane Composites, Inc., Channahon, IL (US)

( * ) Notice: Subject to any disclaimer, the term of this patent is extended or adjusted under 35 U.S.C. 154(b) by 263 days.

(21) Appl. No.: 12/924,403

(22) Filed: Sep. 27, 2010

(65) Prior Publication Data

US 2012/0019024 A1 Jan. 26, 2012

Related U.S. Application Data

(60) Provisional application No. 61/365,971, filed on Jul. 20, 2010.

(51) Int. Cl.
*B62D 25/20* (2006.01)

(52) U.S. Cl.
USPC ..... 296/191; 296/186.1; 428/116; 428/411.1; 428/304.4

(58) Field of Classification Search
CPC ........ B62D 90/022; B62D 90/02; B32B 5/18; B32B 5/00; B32B 3/12
USPC .............. 296/191, 901.01, 39.1, 39.2, 186.1; 428/116, 411.1, 304.4
See application file for complete search history.

(56) References Cited

U.S. PATENT DOCUMENTS

| | | | |
|---|---|---|---|
| 5,403,063 A | 4/1995 | Sjostedt et al. | 296/193.07 |
| 5,843,568 A | 12/1998 | Masui et al. | 428/317.9 |
| 6,482,508 B1 | 11/2002 | Persson et al. | 428/304.04 |
| 6,740,381 B2 | 5/2004 | Day et al. | 428/56 |
| 6,755,998 B1 | 6/2004 | Reichard et al. | 264/26.5 |
| 6,824,851 B1 | 11/2004 | Locher et al. | 428/76 |
| 6,843,525 B2 | 1/2005 | Preisler | 296/193.07 |
| 6,890,637 B2 | 5/2005 | Baker | 428/297.4 |
| 7,930,861 B2 | 4/2011 | Schiffmann et al. | 52/293.1 |
| 2005/0140177 A1* | 6/2005 | Montagna et al. | 296/191 |
| 2005/0161865 A1 | 7/2005 | Bristow et al. | 264/511 |
| 2007/0102849 A1 | 5/2007 | Bristow et al. | 264/510 |
| 2008/0001429 A1 | 1/2008 | Willis et al. | 296/181.2 |
| 2008/0070019 A1 | 3/2008 | Good et al. | 428/218 |
| 2008/0145608 A1* | 6/2008 | Bledsoe et al. | 428/139 |
| 2009/0230729 A1 | 9/2009 | Lusk | 296/193.07 |
| 2010/0066114 A1* | 3/2010 | Winget et al. | 296/24.43 |
| 2010/0151239 A1* | 6/2010 | Hebert et al. | 428/351 |

FOREIGN PATENT DOCUMENTS

| | | |
|---|---|---|
| WO | 97/11825 | 4/1997 |
| WO | 2008/070026 | 6/2008 |

* cited by examiner

*Primary Examiner* — Joseph Pape

(57) ABSTRACT

Embodiments of the present disclosure include a composite panel and a method of manufacturing the composite panel. The composite panel includes first and second fiber reinforced plastic (FRP) layers. The composite panel also includes a core layer disposed between the first and second FRP layers. The core layer includes one of: a honeycomb material and a foam material. The composite panel further includes an exterior layer disposed on a surface of the first FRP layer opposite the core layer and an interior layer disposed on a surface of the second FRP layer opposite the core layer. The layers are cured together in one processing step.

16 Claims, 3 Drawing Sheets

LIGHTWEIGHT MULTI-LAYER COMPOSITE PANEL

CROSS-REFERENCE TO RELATED APPLICATION

This application claims priority under 35 USC 119(e) to U.S. provisional Application Ser. No. 61/365,971, filed on Jul. 20, 2010, and which is incorporated herein by reference.

TECHNICAL FIELD

This disclosure is generally directed to composite materials and more particularly to multi-layer panels having at least one composite layer.

BACKGROUND

Composite materials composed of fiber reinforced plastic (FRP) and plywood or aluminum are widely used in automotive applications, such as for truck body sidewall panels, because of their low cost and structural properties. However, significant problems are associated with these materials. Composite panels having one or more plywood layers are subject to water absorption, rot, and mold growth. Likewise, composite panels having metal layers are subject to corrosion. Further, automotive panels made of composites using either plywood or metal tend to be heavy, which results in less efficiency and high fuel costs for the vehicle.

SUMMARY

According to one embodiment of the present disclosure, a composite panel includes a first fiber reinforced plastic (FRP) layer. The composite panel also includes a second FRP layer. The composite panel further includes a core layer disposed between the first and second FRP layers. The composite panel still further includes an exterior layer disposed on a surface of the first FRP layer opposite the core layer.

In another embodiment, a method of manufacturing a composite panel includes the step of applying an exterior layer on a mold. The method also includes applying a first fiber reinforced plastic (FRP) layer on top of the exterior layer. The method also includes the step of applying a core layer on top of the first FRP layer. The method further includes the step of applying a second FRP layer on top of the core layer.

In still another embodiment, a vehicle includes a chassis, a power train, a plurality of wheels, and a cargo area comprising at least one composite panel. Each composite panel includes a first fiber reinforced plastic (FRP) layer. Each composite panel also includes a second FRP layer. Each composite panel further includes a core layer disposed between the first and second FRP layers. The core layer includes one of: a honeycomb material and a foam material. Each composite panel still further includes an exterior layer disposed on a surface of the first FRP layer opposite the core layer. Each composite panel also includes an interior layer disposed on a surface of the second FRP layer opposite the core layer.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure provides a composite panel capable of many commercial uses, including those in the automotive industry. A preferred application of the disclosed composite panel is for the sidewalls of a cargo area of a truck.

The composite panel according to embodiments of this disclosure is constructed with five (5) layers of material: a weather-resistant exterior coating layer, a fiber reinforced plastic (FRP) sheet, a honeycomb or foam core, a second fiber reinforced plastic (FRP) sheet, and a decorative interior layer. In particular embodiments, the interior layer is a thermoplastic olefin (TPO) layer. All of the layers are integrated together during the curing process of the unsaturated polyester resin that is used in the FRP.

The composite panel according to this disclosure offers many advantages. The panel is generally twenty percent (20%) to more than fifty percent (50%) lighter than panels made with plywood, lauan, or metal. In addition, the panel may provide more thermal insulation and improved acoustic properties than a panel having plywood and/or metal layers. Furthermore, since the composite panel contains no wood or metal layers, it is resistant to water absorption, corrosion, rot, or mold growth.

Figure 1:
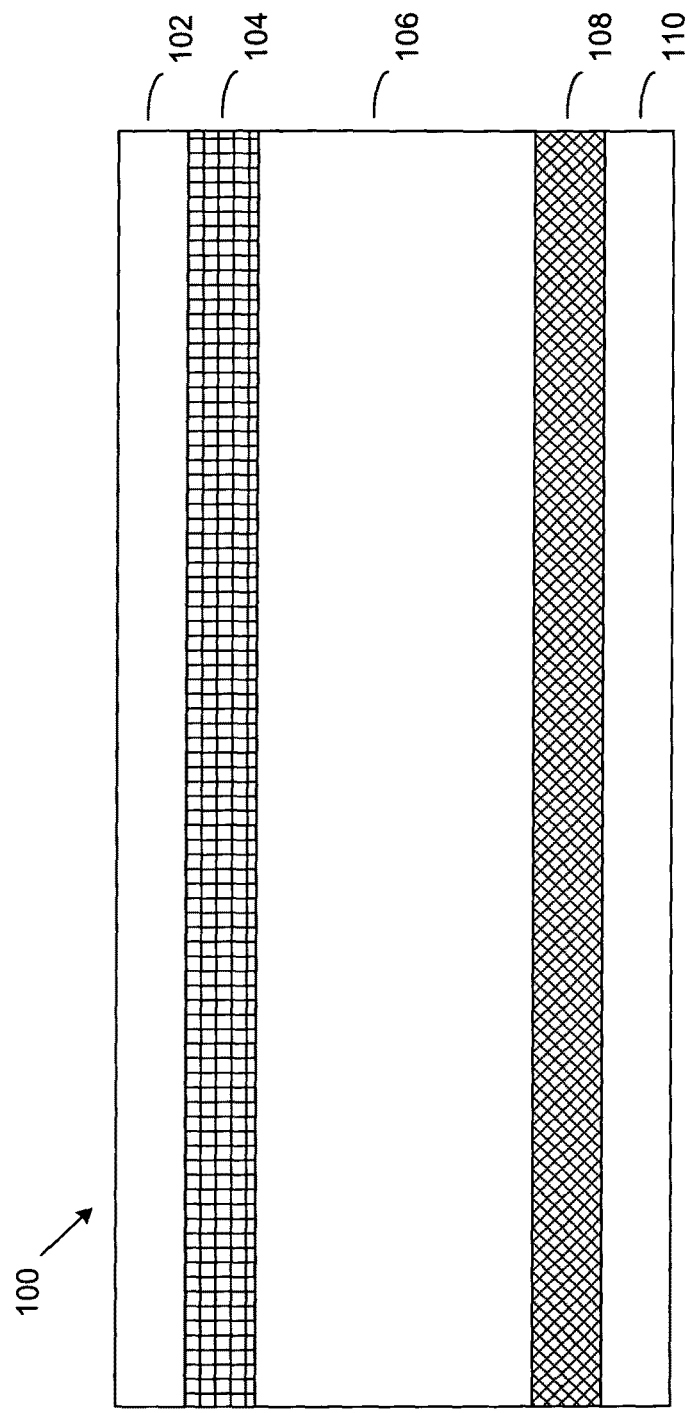
FIG. 1 depicts a cross-sectional view of a composite panel according to one embodiment of the present disclosure.

FIG. 1 depicts a cross-sectional view of a composite panel according to one embodiment of the present disclosure. The embodiment of the composite panel shown in FIG. 1 is for illustration only. Other embodiments of the composite panel could be used without departing from the scope of this disclosure.

Composite panel 100 comprises five layers 102-110. For purposes of clarity of illustration, the thickness of each layer 102-110 may not be drawn to scale. Layer 102 is a weather-resistant exterior finish or coating layer. Layer 104 is a fiber reinforced plastic (FRP) layer. Layer 106 is a honeycomb or foam core layer. Layer 108 is a second FRP layer. In certain embodiments, layer 108 may be composed of the same FRP material as layer 104. In other embodiments, layer 108 may be composed of a different FRP material than layer 104. Layer 110 is a decorative interior finish layer. In some embodiments, layer 110 may be a thermoplastic olefin (TPO) layer.

The middle three (3) layers 104-108 form a FRP/core/FRP sandwich structure that provides sufficient strength and stiffness to composite panel 100 for advantageous use in automotive applications. The two surface layers 102 and 110 provide composite panel 100 with both interior and exterior finished surfaces.

In accordance with the present disclosure, core layer 106 may be a honeycomb material or foam material such as polypropylene honeycomb or polyurethane foam. The honeycomb or foam material in core layer 106 includes small air pockets throughout the material. Unlike in plywood or lauan panels, which are porous and tend to soak up resin, the air pockets in core layer 106 are sealed from the outer surfaces. Thus, core layer 106 does not substantially absorb resin. In one embodiment, core layer 106 accounts for the majority of the panel thickness.

FRP layers 104, 108 may include glass fibers or other reinforcement fibers or materials such as carbon, aromatic polyamide, or natural fibers. The fibers may be held together with one or more resins such as unsaturated polyester, epoxies or phenolic resins. The fiber content and thickness of each FRP layer 104, 108 may vary based on application requirements. In certain embodiments, each FRP layer 104, 108 is generally much thinner than core layer 106.

In certain embodiments, exterior finish layer 102 may be an unsaturated polyester-based gel coat. The gel coat may be commercially available and preferably exhibits field-proven weather resistance. Exterior finish layer 102 may include one or more additional films or layers. For example, a plastic film having text, graphics, and/or other decorative features may be applied to exterior finish layer 102.

In certain embodiments, interior finish layer 110 is a TPO layer. In other embodiments, interior finish layer 110 may be a vinyl material. One side of interior finish layer 110 may be bonded with a fiber matrix or mesh backing that allows a polyester resin in FRP layer 108 to saturate into and bond to layer 110. The other side of interior finish layer 110 may be smooth or have a textured finish, based on requirements of the finished application. Interior finish layer 110 may be reinforced to provide advantageous strength characteristics. Interior finish layer 110 is available in a variety of colors, such as white, gray and tan. Additional coloring may be added to interior finish layer 110 to create other colors or color effects. In other embodiments, interior finish layer 110 may be a clear or translucent film that permits characteristics of FRP layer 108 (e.g., color, texture) to be visible. The film may also be removable after manufacturing, thus leaving FRP layer 108 as a finished interior surface. In certain embodiments, the film may be smooth or textured, thereby making the interior finish smooth or textured accordingly.

In conventional panels, an FRP layer and core material are manufactured separately. The individually manufactured layers are bonded together, either through adhesive or heat in a secondary manufacturing process. Any exterior and/or interior finish is applied later. However, in accordance with the current disclosure, the five layers are bonded together and cured in one processing step. The layers may be bonded together by the resin in the FRP layer, or an additional adhesive may be used. This results in significant cost saving and improved product integrity.

Although FIG. 1 depicts one example of a composite panel 100, various changes may be made to FIG. 1. For example, while shown composed of five layers, composite panel 100 may include more or fewer than five layers. Layers 102-110 shown in FIG. 1 may be removed, repeated, or arranged in a different order. Each layer 102-110 may be thicker or thinner than depicted in FIG. 1. Each layer 102-110 may include one or more sub-layers. Other layers, composed of the same or different materials, may be added to composite panel 100.

Figure 2:
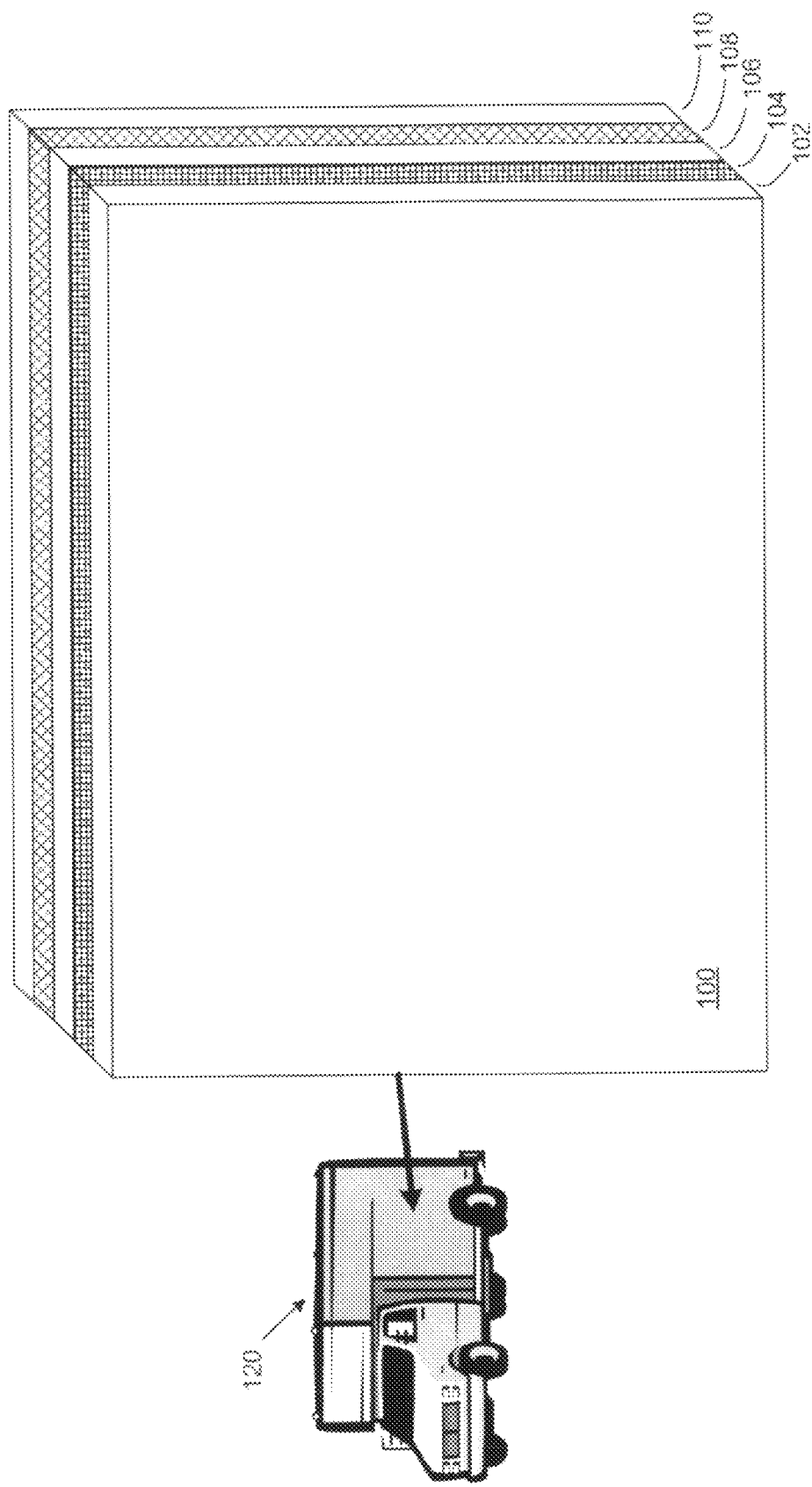
FIG. 2 depicts a plan view of a composite panel according to one embodiment of the present disclosure.

FIG. 2 depicts a plan view of composite panel 100 according to one embodiment of the present disclosure. The embodiment of composite panel 100 shown in FIG. 2 is for illustration only. Other embodiments of composite panel 100 could be used without departing from the scope of this disclosure. For clarity in the illustration, layers 102-110 of composite panel 100 are not drawn to scale.

Composite panel 100 is configured for use in automotive applications, such as one or more sidewalls of a cargo area of a truck 120. Composite panel 100 can be easily tailored for specific performance and load requirements. For example, core layer 106 and FRP layers 104, 108 may be selected to meet flexural strength requirements of the sidewalls of truck 120.

Composite panel 100 may be bent, cut, spliced, stamped, deformed, molded, or otherwise shaped into any configuration suitable for use in manufacturing, commercial, or other applications. For example, composite panel 100 may be manufactured to the necessary dimensions for a sidewall of truck 120. Alternatively, composite panel 100 may be manufactured oversize and trimmed to the necessary dimensions for the sidewall of truck 120. Once composite panel 100 has the appropriate dimensions, it may be affixed to a frame surrounding the cargo area of truck 120.

Figure 3:
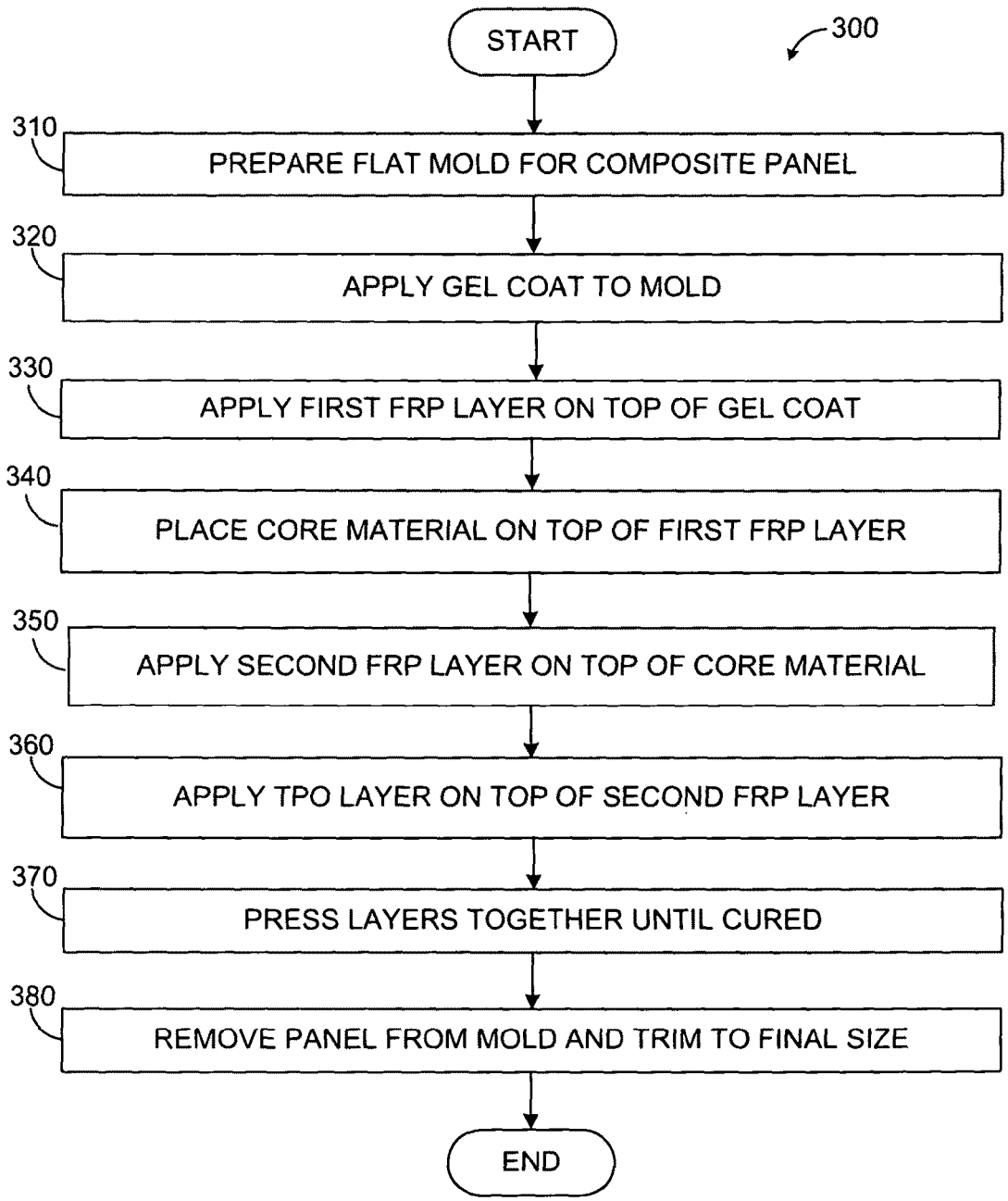
FIG. 3 depicts a method for manufacturing a composite panel according to one embodiment of the present disclosure.

FIG. 3 depicts a method for manufacturing a composite panel (e.g., composite panel 100) according to one embodiment of the present disclosure. The method shown in FIG. 3 is for illustration only. Other embodiments of the method could be used without departing from the scope of this disclosure.

First, a flat mold is prepared in which the composite panel will be created (step 310). In certain embodiments, the size of the mold is selected to approximately match the desired size of the finished panel. Next, a gel coat is sprayed, brushed, rolled, or otherwise applied to the mold (step 320). The gel coat serves as an exterior layer of the composite panel (e.g., exterior finish layer 102). Next, an FRP layer (e.g., FRP layer 104) is sprayed, brushed, rolled, or otherwise applied on top of the gel coat (step 330).

Next, a core material (e.g., core layer 106) is laid or placed on top of the FRP layer (step 340). Next, a second FRP layer (e.g., FRP layer 108) is sprayed, brushed, rolled, or otherwise applied on top of the core material (step 350). Next, a TPO layer is placed or applied on top of the second FRP layer (step 360). The TPO layer serves as an interior layer of the panel (e.g., interior finish layer 110). Next, the layers are pressed together using a vacuum bag or press until the layers cure (step 370). Once the layers are cured, the panel is removed from the mold and trimmed to its final size (step 380).

Although FIG. 3 illustrates one example of a method for manufacturing a composite panel, various changes may be made to FIG. 3. For example, while shown as a series of steps, various steps in FIG. 3 may overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A composite panel, comprising:
a first fiber reinforced plastic (FRP) layer;
a second FRP layer;
a core layer disposed between the first and second FRP layers, the core layer having first and second outer surfaces respectively facing the first and second FRP layers, and containing air pockets, the air pockets being sealed from the outer surfaces of the core layer; and an exterior layer disposed on a surface of the first FRP layer opposite the core layer.

2. The composite panel of claim 1, further comprising an interior layer disposed on a surface of the second FRP layer opposite the core layer.

3. The composite panel of claim 1, wherein the core layer comprises one of: a honeycomb material and a foam material.

4. The composite panel of claim 3, wherein the core layer comprises one of: a polypropylene honeycomb and a polyurethane foam.

5. The composite panel of claim 1, wherein the exterior layer comprises an unsaturated polyester-based gel coat.

6. The composite panel of claim 5, wherein the exterior layer further comprises a decorative film.

7. The composite panel of claim 2, wherein the interior layer comprises one of: a thermoplastic olefin (TPO) layer and a vinyl layer.

8. The composite panel of claim 2, wherein the interior layer has a textured surface.

9. The composite panel of claim 1, wherein the second FRP layer has a textured surface.

10. The composite panel of claim 1, wherein each of the first and second FRP layers comprises:
at least one of: glass fibers, carbon fibers, and aromatic polyamide fibers; and
at least one of: unsaturated polyester resin and phenolic resin.

11. The composite panel of claim 2, wherein the exterior layer, first FRP layer, core layer, second FRP layer, and interior layer are bonded together with at least one resin from the first and second FRP layers.

12. The composite panel of claim 1, wherein the composite panel is configured for use as a sidewall of a cargo area of a vehicle.

13. The composite panel of claim 1, wherein the composite panel does not comprise a plywood layer.

14. A vehicle comprising:
a chassis;
a power train;
a plurality of wheels; and
a cargo area comprising at least one composite panel, each of the at least one composite panel comprising:
a first fiber reinforced plastic (FRP) layer; a second FRP layer;
a core layer disposed between the first and second FRP layers, the core layer comprising one of a honeycomb material and a foam material, and the core layer having first and second outer surfaces respectively facing the first and second FRP layers, and containing air pockets, the air pockets being sealed from the outer surfaces of the core layer;
an exterior layer disposed on a surface of the first FRP layer opposite the core layer; and
an interior layer disposed on a surface of the second FRP layer opposite the core layer.

15. The vehicle according to claim 14, wherein the core layer comprises one of: a polypropylene honeycomb and a polyurethane foam.

16. The vehicle according to claim 14, wherein the exterior layer, first FRP layer, core layer, second FRP layer, and interior layer are bonded together with at least one resin from the first and second FRP layers.

* * * * *